US012567420B2

(12) United States Patent
Xiong et al.

(10) Patent No.: US 12,567,420 B2
(45) Date of Patent: Mar. 3, 2026

(54) METHOD AND APPARATUS FOR CONTROLLING SOUND RECEIVING DEVICE BASED ON DUAL-MODE AUDIO THREE-DIMENSIONAL CODE

(71) Applicant: AUDICON CORPORATION, Ontario, CA (US)

(72) Inventors: Zhihui Xiong, Guangdong (CN); Wang Chen, Guangdong (CN)

(73) Assignee: AUDICON CORPORATION, Ontario, CA (US)

( * ) Notice: Subject to any disclaimer, the term of this patent is extended or adjusted under 35 U.S.C. 154(b) by 407 days.

(21) Appl. No.: 18/316,173

(22) Filed: May 11, 2023

(65) Prior Publication Data

US 2024/0038247 A1 Feb. 1, 2024

(30) Foreign Application Priority Data

Jul. 28, 2022 (CN) ........................ 202210901398.0

(51) Int. Cl.
*G10L 19/00* (2013.01)
*G10L 21/10* (2013.01)

(52) U.S. Cl.
CPC .............. *G10L 19/00* (2013.01); *G10L 21/10* (2013.01)

(58) Field of Classification Search
CPC ....... G10L 19/00; G10L 21/10; G10L 13/047; G10L 13/04; G09B 21/009; H04R 25/502
See application file for complete search history.

(56) References Cited

U.S. PATENT DOCUMENTS 6,704,422 B1 * 3/2004 Jensen ................. H04R 25/502 381/313
7,693,707 B2 * 4/2010 Yamanashi ........... G10L 19/032 704/229

(Continued)

FOREIGN PATENT DOCUMENTS

JP 6729923 B1 * 7/2020
KR 20180044957 A * 5/2018 ............. G10L 25/21
WO WO-2018042791 A1 * 3/2018 ............. G06N 3/045

OTHER PUBLICATIONS

Jonathan Dennis, Huy Dat Tran, Haizhou Li,"Spectrogram Image Feature for Sound Event Classification in Mismatched Conditions", IEEE, vol. 18, Feb. 2011 (Year: 2011).*

*Primary Examiner* — Paras D Shah
*Assistant Examiner* — Nadira Sultana
(74) *Attorney, Agent, or Firm* — JCIPRNET

(57) ABSTRACT

This application relates to a method and an apparatus for controlling a sound receiving device based on a dual-mode audio three-dimensional code and a method and an apparatus for parsing a control signal of a sound receiving device based on a dual-mode audio three-dimensional code. The method includes: receiving an operation instruction and encoding the operation instruction as a digital vector; obtaining a first audio three-dimensional code corresponding to a preset speech signal, and encoding the digital vector into the first audio three-dimensional code to obtain a second audio three-dimensional code; and converting the second audio three-dimensional code into a speech signal and sending the speech signal to a sound receiving device. In the method, operation convenience can be improved, and an instruction operation can be performed without arrangement of any additional module.

19 Claims, 2 Drawing Sheets

(56) References Cited

U.S. PATENT DOCUMENTS

| | | | | |
|---|---|---|---|---|
| 11,960,852 | B2 * | 4/2024 | Jia | G10L 13/00 |
| 2020/0227067 | A1 * | 7/2020 | Chen | G09B 21/009 |
| 2021/0035551 | A1 * | 2/2021 | Stanton | G10L 13/04 |
| 2021/0235189 | A1 * | 7/2021 | Secall | H04S 1/002 |
| 2022/0157316 | A1 * | 5/2022 | Rebryk | G10L 13/04 |
| 2022/0383851 | A1 * | 12/2022 | Casagrande | G10L 13/047 |
| 2023/0037892 | A1 * | 2/2023 | Joo | G10L 13/047 |
| 2023/0112622 | A1 * | 4/2023 | Jun | G06T 1/0028<br>704/232 |

* cited by examiner

METHOD AND APPARATUS FOR CONTROLLING SOUND RECEIVING DEVICE BASED ON DUAL-MODE AUDIO THREE-DIMENSIONAL CODE

CROSS-REFERENCE TO RELATED APPLICATION

This application claims the priority benefit of China application serial no. 202210901398.0, filed on Jul. 28, 2022. The entirety of the above-mentioned patent application is hereby incorporated by reference herein and made a part of this specification.

TECHNICAL FIELD

This application relates to the field of computer technologies, and in particular, to a method and an apparatus for controlling a sound receiving device based on a dual-mode audio three-dimensional code.

BACKGROUND

A sound receiving device is a device inside which a sound signal can be parsed to convert the sound signal into an electric signal. Common sound receiving devices include a Bluetooth headset, a wearable device, a hearing aid, and the like. The hearing aid is used below for specific description. According to the latest data from the World Health Organization, about 390 million people suffer from disability hearing loss worldwide, accounting for about five percent of the total global population, among which 33 million are children. Although hearing loss does not have too much impact on life safety, hearing loss still causes many inconveniences in daily life. At present, the hearing aid is a mainstream and relatively effective means of compensating for hearing loss of hearing loss patients. After decades of development, the hearing aid has entered an era of an intelligent digital hearing aid that processes a digital signal from an era of a conventional analog hearing aid that mainly performs processing by using an analog device.

The digital hearing aid often provides some manual control options. For example, for better working, the hearing aid, particularly, a behind-the-ear hearing aid, provides several scene modes (for controlling a scene mode, a volume level, or the like) for selection by a user. A conventional method is installing several buttons on the behind-the-ear hearing aid, and the user performs selection by pressing the button, to achieve a better hearing effect. However, because the behind-the-ear hearing aid is relatively small in size, and the button is even smaller in size, operation is not convenient and user experience is poor.

SUMMARY

In view of this, for the foregoing technical problem, a method and an apparatus for controlling a sound receiving device based on a dual-mode audio three-dimensional code need to be provided to resolve a problem that operation is inconvenient when a sound receiving device uses a knob, a button, or a key.

A method for controlling a sound receiving device based on a dual-mode audio three-dimensional code is provided. The method includes:

receiving an operation instruction and encoding the operation instruction as a digital vector;

obtaining a first audio three-dimensional code corresponding to a preset speech signal, and encoding the digital vector into the first audio three-dimensional code to obtain a second audio three-dimensional code; and converting the second audio three-dimensional code into a speech signal and sending the speech signal to a sound receiving device.

In an embodiment, the method further includes: selecting control indicators corresponding to element values from the first audio three-dimensional code; calculating grayscale values corresponding to different elements in the digital vector based on the control indicators and a preset control parameter; and encoding the digital vector into the first audio three-dimensional code based on a sound spectrogram grayscale value corresponding to each element in the digital vector, to obtain the second audio three-dimensional code.

In an embodiment, the method further includes: obtaining distribution information of the element values in the first audio three-dimensional code; and determining at least two control indicators based on the distribution information.

In an embodiment, the method further includes: calculating a maximum value and a minimum value of the element values based on the distribution information, and performing sampling at a preset step based on the maximum value and the minimum value to obtain a plurality of control values; and obtaining the control indicators based on the maximum value, the minimum value, and the control values.

In an embodiment, the method further includes: calculating a maximum value, a minimum value, and a mean value of the element values based on the distribution information; and using the maximum value, the minimum value, and the mean value as the control indicators.

In an embodiment, the method further includes: using the preset control parameter as an adjustment weight, performing logical calculation between the control indicators, and weighting a logical calculation result by using the adjustment weight, to obtain the sound spectrogram grayscale values corresponding to the different elements in the digital vector.

In an embodiment, the method further includes: calculating a difference between the maximum value and the minimum value, and multiplying the difference by the control parameter to obtain deviation information; and performing addition/subtraction calculation based on the mean value and the deviation information to obtain the sound spectrogram grayscale values corresponding to the different elements in the digital vector, where the sound spectrogram grayscale values corresponding to the different elements in the digital vector are determined by controlling a size of the deviation information and a sign of the addition/subtraction calculation.

In an embodiment, the method further includes: performing splicing on the digital vector based on the sound spectrogram grayscale value corresponding to each element in the digital vector to obtain an audio three-dimensional code segment; and inserting the audio three-dimensional code segment into the first audio three-dimensional code to obtain the second audio three-dimensional code.

In an embodiment, the method further includes: obtaining a preset position parameter, and inserting the audio three-dimensional code segment into a position corresponding to the position parameter in the first audio three-dimensional code based on the position parameter, to obtain the second audio three-dimensional code.

In an embodiment, the method further includes: performing inverse Fourier transform on the second audio three-dimensional code to obtain the speech signal; and sending the speech signal to the sound receiving device as an instruction control signal.

In an embodiment, the method further includes: the sound receiving device is a hearing aid or a digital hearing aid.

An apparatus for controlling a sound receiving device based on a dual-mode audio three-dimensional code is provided. The apparatus includes:

an instruction receiving module, configured to receive an operation instruction and encode the operation instruction as a digital vector;

an audio three-dimensional code construction module, configured to obtain a first audio three-dimensional code corresponding to a preset speech signal, and encode the digital vector into the first audio three-dimensional code to obtain a second audio three-dimensional code; and a signal sending module, configured to convert the second audio three-dimensional code into a speech signal and send the speech signal to a sound receiving device.

A method for parsing a control signal of a sound receiving device based on a dual-mode audio three-dimensional code is provided. The method includes:

receiving the foregoing speech signal sent by a terminal;

converting the speech signal to obtain a third audio three-dimensional code, registering the third audio three-dimensional code with a pre-stored first audio three-dimensional code, and extracting a digital vector from the third audio three-dimensional code if registration succeeds; and obtaining an operation instruction through parsing based on the digital vector and a pre-stored mapping relationship between the digital vector and the operation instruction.

In an embodiment, the method further includes: traversing element values in the first audio three-dimensional code and the third audio three-dimensional code, where registration succeeds when a sum of differences between the element values in the first audio three-dimensional code and the third audio three-dimensional code is less than a threshold.

In an embodiment, the method further includes: obtaining a deviation existing between the first audio three-dimensional code and the third audio three-dimensional code when the sum of the differences between the element values in the first audio three-dimensional code and the third audio three-dimensional code is less than the threshold; and extracting the digital vector from the third audio three-dimensional code based on the deviation.

In an embodiment, the method further includes: selecting a corresponding area in the third audio three-dimensional code based on a position parameter and registering the corresponding area with the first audio three-dimensional code.

In an embodiment, the method further includes: registering the third audio three-dimensional code F3 with the pre-stored first audio three-dimensional code F1 according to a registration algorithm, where the registration algorithm is as follows:

$$f(a,b,c)=\Sigma|F1(x,y,z)-F3(x+a,y+b,z+c)|,\ \text{where}$$

element values in the third audio three-dimensional code F3 are traversed to find a deviation (a0,b0,c0) that minimizes f(a,b,c), and registration succeeds when f(a0, b0, c0)<th, where th is a threshold.

In an embodiment, the method further includes: if registration succeeds, extracting a data block from the third audio three-dimensional code by using an extraction algorithm, and parsing the data block to obtain the digital vector, where the extraction algorithm is as follows:

$$D2=F3(s1+a0:s1+a0+w0-1,s1+b0:s1+b0+Nw0-1,s1+c0:s1+c0+w0-1),$$

where

D2 indicates the data block, s1 indicates the position parameter, a length, a width, and a height of each component in the digital vector are all w0, and N indicates a quantity of components.

In an embodiment, the method further includes: parsing the data block by using a decoding algorithm, to obtain the digital vector, where the decoding algorithm is as follows:

$$vect2(i)=g\left(\frac{1}{w0\times w0\times w0\times m3}\sum D2(:,(i-1)w0+1:iw0,:)\right)$$

where m3 indicates a mean value of elements in the first audio three-dimensional code, vect2(i) indicates the digital vector, $$g(x)=\begin{cases}0 & x\leq 1\\ 1 & x>1\end{cases},$$

and $i\in[1, N]$.

In an embodiment, the method further includes: the terminal is a mobile phone, a tablet computer, or a wearable device.

A computer device is provided, including a memory and a processor. The memory stores a computer program, and the processor implements the steps of the foregoing methods when executing the computer program.

A computer-readable storage medium is provided. The computer-readable storage medium stores a computer program. The steps of the foregoing methods are implemented when the computer program is executed by a processor.

DESCRIPTION OF EMBODIMENTS

To make the objectives, technical solutions, and advantages of this application clearer and more comprehensible, the following further describes this application in detail with reference to the accompanying drawings and embodiments. It should be understood that specific embodiments described herein are merely intended to explain this application and are not intended to limit this application.

Figure 1:
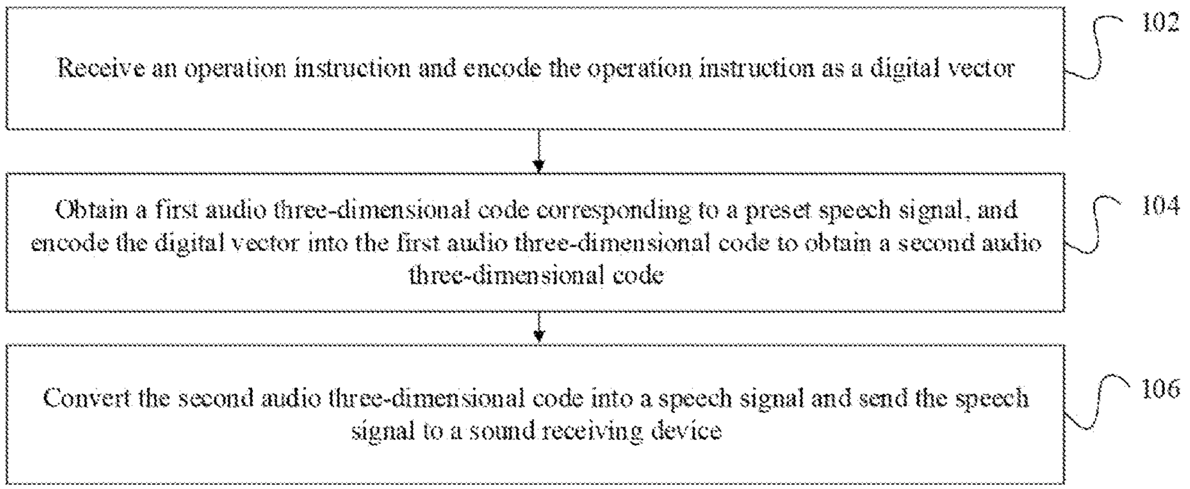
FIG. 1 is a schematic flowchart of a method for controlling a sound receiving device based on a dual-mode audio three-dimensional code according to an embodiment.
Figure 2:
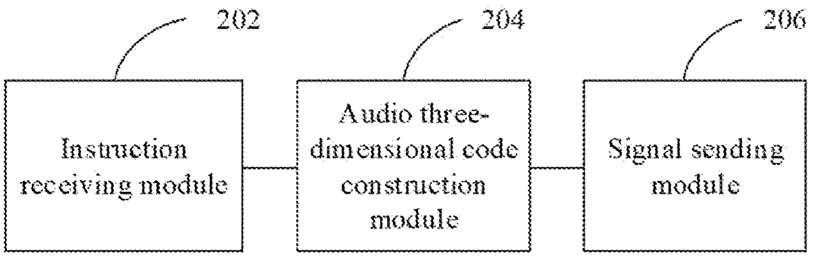
FIG. 2 is a block diagram of a structure of an apparatus for controlling a sound receiving device based on a dual-mode audio three-dimensional code according to an embodiment.

In an embodiment, as shown in FIG. 1, a method for controlling a sound receiving device based on a dual-mode audio three-dimensional code is provided, including the following steps:

Step 102: Receive an operation instruction and encode the operation instruction as a digital vector.

The operation instruction is an instruction for operating a sound receiving device. Usually, a sending manner of the operation instruction includes infrared sending, that is, a digital sequence is sent by using an infrared transmitter, and a receiving device needs to parse an infrared signal to obtain the digital sequence, to recognize the corresponding operation instruction. In addition, the instruction may be alternatively sent by using a network, Bluetooth, or the like. However, for a sound receiving device without a network or Bluetooth protocol, an additional chip needs to be disposed to parse a network signal, to obtain an operation instruction.

In the present invention, the operation instruction is directly encoded as the digital vector that can be recognized by a computer.

Step 104: Obtain a first audio three-dimensional code corresponding to a preset speech signal, and encode the digital vector into the first audio three-dimensional code to obtain a second audio three-dimensional code.

The audio three-dimensional code is essentially a spectral representation of a sound signal. In the audio three-dimensional code, a y-axis represents a frequency, an x-axis represents time, and a z-axis represents amplitude. The amplitude is represented by a color, and an energy distribution status at a specified frequency end can be viewed by using a spectrogram. In this embodiment, the audio three-dimensional code is obtained through dual-mode speech synthesis, and includes a control signal of a digital signal and a speech signal of an analog quantity, thereby constituting a dual-mode audio three-dimensional code. The speech signal in the dual-mode audio three-dimensional code constitutes a time dimension and a frequency dimension, and the digital vector constitutes the third dimension, namely, an amplitude dimension.

In this embodiment, an audio three-dimensional code corresponding to a specified background sound may be selected as the first audio three-dimensional code. However, a premise is that the digital vector can be easily separated from the second audio three-dimensional code obtained by encoding the digital vector into the first audio three-dimensional code. For example, the digital vector is three segments of signals of different frequencies. When the digital vector is added to the first audio three-dimensional code, the digital vector is three line segments in the second audio three-dimensional code. Therefore, the digital vector can be easily parsed from the second audio three-dimensional code, thereby implementing a corresponding operation.

Step 106: Convert the second audio three-dimensional code into a speech signal and send the speech signal to the sound receiving device.

According to the foregoing method for controlling a sound receiving device based on a dual-mode audio three-dimensional code, first, for a sound receiving device that can recognize a speech signal, instead of using a knob or a button for control, an operation instruction is digitally encoded to obtain a digital vector, and then a first audio three-dimensional code corresponding to a speech signal is selected, and the digital vector is encoded into the first audio three-dimensional code to obtain a second audio three-dimensional code. Because control of the digital vector does not cause a change of output of the speech signal, the operation instruction is sent to the sound receiving device along with the speech signal. Second, because the sound receiving device can parse the speech signal, the control method of the present invention requires no modification to the sound receiving device and also causes no additional power consumption, and is particularly applicable to a device, such as a digital hearing aid, with a high volume requirement and endurance requirement.

In an embodiment, because the audio three-dimensional code includes rich information, such as frequency information and amplitude information, the digital vector can be better carried by using the information, thereby implementing better control. In this embodiment, because the amplitude is reflected by the color, specific element values may be selected as control indicators. Therefore, grayscale values corresponding to different elements in the digital vector are calculated based on the control indicators and a preset control parameter; and the digital vector is encoded into the first audio three-dimensional code based on a sound spectrogram grayscale value corresponding to each element in the digital vector, to obtain the second audio three-dimensional code. In this embodiment of the present invention, the information in the audio three-dimensional code is properly used, and an appropriate control parameter is selected. Therefore, when the digital vector is encoded into the first audio three-dimensional code, less environmental interference is caused to the second audio three-dimensional code when the second audio three-dimensional code is converted into the speech signal. In addition, when the digital vector is encoded into the first audio three-dimensional code, an original speech signal is not changed. For a private device, concealment of an operation instruction operation is increased, that is, an operation can be implemented by using one sentence of speech that may not be related to the operation instruction.

In an embodiment, distribution information of the element values in the first audio three-dimensional code is obtained, and at least two control indicators are determined based on the distribution information. The control indicators are determined based on the distribution information. For example, a maximum value, a minimum value, and a mean value of the element values are selected. The control indicators are determined by analyzing the distribution information, so that the digital vector can be better encoded into the first audio three-dimensional code.

In an embodiment, the maximum value and the minimum value of the element values are calculated based on the distribution information, and sampling is performed at a preset step based on the maximum value and the minimum value to obtain a plurality of control values; and the control indicators are obtained based on the maximum value, the minimum value, and the control values.

Specifically, if the first audio three-dimensional code is represented as a maximum value m1, a minimum value m2, and a mean value m3 of elements in F1(x, y, z), the maximum value m1, the minimum value m2, and the mean value m3 are selected as the control indicators.

In another embodiment, the preset control parameter is used as an adjustment weight, logical calculation is performed between the control indicators, and a logical calculation result is weighted by using the adjustment weight, to obtain the grayscale values corresponding to the different elements in the digital vector. That is, the grayscale values corresponding to the different elements in the digital vector are determined based on both the control parameter and the control indicators.

In an embodiment, a difference between the maximum value and the minimum value is calculated, and the difference is multiplied by the control parameter to obtain deviation information; and addition/subtraction calculation is performed based on the mean value and the deviation information to obtain the sound spectrogram grayscale values corresponding to the different elements in the digital vector, where the sound spectrogram grayscale values corresponding to the different elements in the digital vector are determined by controlling a size of the deviation information and a sign of the addition/subtraction calculation.

A specific formula is as follows: A sound spectrogram grayscale value corresponding to a number 0 in a binary vector vect is calculated as follows:

$$g1=m3-\alpha 1\times(m1-m2),\ \text{where}$$

$\alpha 1\in(0.2,0.5)$ and is a control parameter.

A sound spectrogram grayscale value corresponding to a number 1 in the binary vector vect is calculated as follows:

$$g2=m3+\alpha 2\times(m1-m2),\ \text{where}$$

$\alpha 2\in(0.2,0.5)$ and is a control parameter.

In an embodiment, splicing is performed on the digital vector based on the sound spectrogram grayscale value corresponding to each element in the digital vector to obtain an audio three-dimensional code segment; and the audio three-dimensional code segment is inserted into the first audio three-dimensional code to obtain the second audio three-dimensional code.

Specifically, a length of the digital vector vect is denoted as N. One audio three-dimensional code segment is generated for each component of the digital vector vect, a size of the audio three-dimensional code segment is w0×w0×w0, $w0\in[1,10]$, a corresponding sound spectrogram grayscale value is g1 when the component is 0, and a corresponding sound spectrogram grayscale value is g2 when the component is 1. Then, these data blocks are sequentially spliced in a horizontal direction to obtain an audio three-dimensional code segment D(x,y,z) whose size is w0×Nw0×w0.

In an embodiment, a preset position parameter is obtained, and the audio three-dimensional code segment is inserted into a position corresponding to the position parameter in the first audio three-dimensional code based on the position parameter, to obtain the second audio three-dimensional code.

In this embodiment, the data D(x, y, z) is directly assigned to a position behind the middle of the first audio three-dimensional code F (x, y, z) to obtain a new audio three-dimensional code:

$$F2(s1:s1+w0-1,s1:s1+Nw0-1,s1:s1+w0-1)=D,\ \text{where}$$

$$s1>\frac{1}{2}W$$

and is a position-related parameter.

In an embodiment, inverse Fourier transform is performed on the second audio three-dimensional code to obtain the speech signal; and the speech signal is sent to the sound receiving device as an instruction control signal.

In an embodiment, the sound receiving device is a hearing aid or a digital hearing aid. A new speech signal E2 is played by using a mobile control end, so that the sound receiving device receives the new speech signal E2, to perform control.

It should be understood that though the steps in the flowchart of FIG. 1 are sequentially shown as indicated by arrows, these steps are not necessarily performed in an order indicated by the arrows. Unless expressly stated in this specification, there is no strict sequence limitation on execution of these steps, and these steps may be performed in another sequence. In addition, at least some of the steps in FIG. 1 may include a plurality of substeps or a plurality of stages. These substeps or stages are not necessarily performed at a same moment, but may be performed at different moments. These substeps or stages are not necessarily sequentially performed, either, but may be performed in turn or alternately with other steps, substeps of other steps, or at least some of stages.

In an embodiment, an apparatus for controlling a sound receiving device based on a dual-mode audio three-dimensional code is provided, including an instruction receiving module 202, an audio three-dimensional code construction module 204, and a signal sending module 206.

The instruction receiving module 202 is configured to receive an operation instruction and encode the operation instruction as a digital vector.

The audio three-dimensional code construction module 204 is configured to obtain a first audio three-dimensional code corresponding to a preset speech signal, and encode the digital vector into the first audio three-dimensional code to obtain a second audio three-dimensional code.

The signal sending module 206 is configured to convert the second audio three-dimensional code into a speech signal and send the speech signal to a sound receiving device.

For a specific definition of the apparatus for controlling a sound receiving device based on a dual-mode audio three-dimensional code, refer to the foregoing definition of the method for controlling a sound receiving device based on a dual-mode audio three-dimensional code. Details are not described herein again. All or some of the modules in the apparatus for controlling a sound receiving device based on a dual-mode audio three-dimensional code may be implemented by using software, hardware, or a combination of software or hardware. The foregoing modules may be built in or independent of a processor of a computer device in a hardware form, or may be stored in a memory of the computer device in a software form, so that the processor invokes and performs operations corresponding to the modules.

In an embodiment, a method for parsing a control signal of a sound receiving device based on a dual-mode audio three-dimensional code is further provided, corresponding to the foregoing method for controlling a sound receiving device based on a dual-mode audio three-dimensional code, and including the following steps:

Step 302: Receive a speech signal sent by a terminal.

Step 304: Convert the speech signal to obtain a third audio three-dimensional code, register the third audio three-dimensional code with a pre-stored first audio three-dimensional code, and extract a digital vector from the third audio three-dimensional code if registration succeeds.

Step 306: Obtain an operation instruction through parsing based on the digital vector and a pre-stored mapping relationship between the digital vector and the operation instruction.

In an embodiment, element values in the first audio three-dimensional code and the third audio three-dimensional code are traversed, where registration succeeds when a sum of differences between the element values in the first audio three-dimensional code and the third audio three-dimensional code is less than a threshold.

In another embodiment, a deviation existing between the first audio three-dimensional code and the third audio three-dimensional code when the sum of the differences between the element values in the first audio three-dimensional code and the third audio three-dimensional code is less than the threshold; and the digital vector is extracted from the third audio three-dimensional code based on the deviation.

In still another embodiment, a corresponding area in the third audio three-dimensional code is selected based on a position parameter and the corresponding area is registered with the first audio three-dimensional code.

Specifically, the third audio three-dimensional code F3 is registered with the pre-stored first audio three-dimensional code F1 according to a registration algorithm, where the registration algorithm is as follows:

$$f(a,b,c)=\Sigma|F1(x,y,z)-F3(x+a,y+b,z+c)|,\ \text{where}$$

element values in the third audio three-dimensional code F3 are traversed to find a deviation (a0,b0,c0) that minimizes f(a,b,c), and registration succeeds when f(a0, b0, c0)<th, where th is a threshold.

In addition, if registration succeeds, a data block is extracted from the third audio three-dimensional code by using an extraction algorithm, and the data block is parsed to obtain the digital vector, where the extraction algorithm is as follows:

$$D2=F3(s1+a0:s1+a0+w0-1,s1+b0:s1+b0+Nw0-1,s1+c0:s1+c0+w0-1),$$

where

D2 indicates the data block, s1 indicates the position parameter, a length, a width, and a height of each component in the digital vector are all w0, and N indicates a quantity of components.

In an embodiment, the parsing the data block to obtain the digital vector includes:

parsing the data block by using a decoding algorithm, to obtain the digital vector, where the decoding algorithm is as follows:

$$vect2(i)=g\left(\frac{1}{w0\times w0\times w0\times m3}\sum D2(:,(i-1)w0+1:iw0,:)\right)$$

where m3 indicates a mean value of elements in the first audio three-dimensional code, vect2(i) indicates the digital vector, $$g(x)=\begin{cases}0 & x\le 1\\ 1 & x>1\end{cases},$$

and i∈[1,N].

In an embodiment, the terminal is a mobile phone, a tablet computer, or a wearable device.

Figure 3:
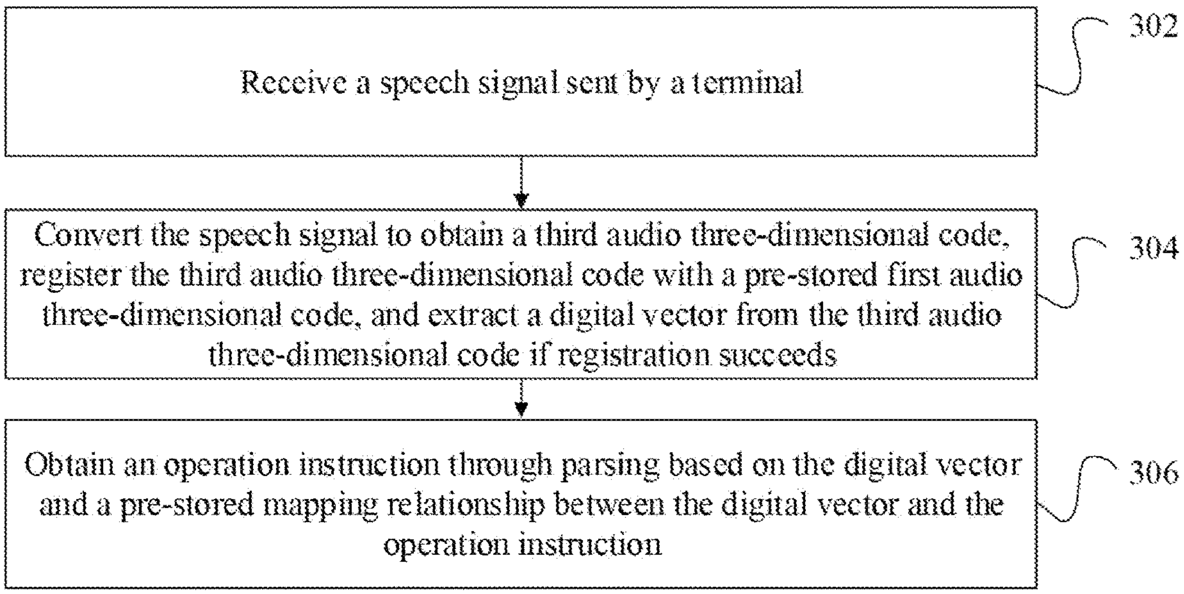
FIG. 3 is a schematic flowchart of a method for parsing a control signal of a sound receiving device based on a dual-mode audio three-dimensional code according to an embodiment.
Figure 4:
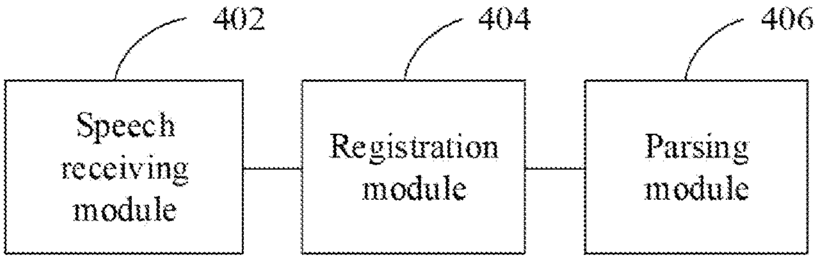
FIG. 4 is a block diagram of a structure of an apparatus for parsing a control signal of a sound receiving device based on a dual-mode audio three-dimensional code according to an embodiment.

It should be understood that though the steps in the flowchart of FIG. 3 are sequentially shown as indicated by arrows, these steps are not necessarily performed in an order indicated by the arrows. Unless expressly stated in this specification, there is no strict sequence limitation on execution of these steps, and these steps may be performed in another sequence. In addition, at least some of the steps in FIG. 3 may include a plurality of substeps or a plurality of stages. These substeps or stages are not necessarily performed at a same moment, but may be performed at different moments. These substeps or stages are not necessarily sequentially performed, either, but may be performed in turn or alternately with other steps, substeps of other steps, or at least some of stages.

In an embodiment, an apparatus for parsing a control signal of a sound receiving device based on a dual-mode audio three-dimensional code is provided. The apparatus includes:

a speech receiving module 402, configured to receive a speech signal sent by a terminal;

a registration module 404, configured to convert the speech signal to obtain a third audio three-dimensional code, register the third audio three-dimensional code with a pre-stored first audio three-dimensional code, and extract a digital vector from the third audio three-dimensional code if registration succeeds; and a parsing module 406, configured to obtain an operation instruction through parsing based on the digital vector and a pre-stored mapping relationship between the digital vector and the operation instruction.

For a specific definition of the apparatus for parsing a control signal of a sound receiving device based on a dual-mode audio three-dimensional code, refer to the foregoing definition of the method for parsing a control signal of a sound receiving device based on a dual-mode audio three-dimensional code. Details are not described herein again. All or some of the modules in the apparatus for parsing a control signal of a sound receiving device based on a dual-mode audio three-dimensional code may be implemented by using software, hardware, or a combination of software or hardware. The foregoing modules may be built in or independent of a processor of a computer device in a hardware form, or may be stored in a memory of the computer device in a software form, so that the processor invokes and performs operations corresponding to the modules.

In an embodiment, a system for parsing a control signal of a sound receiving device based on a dual-mode audio three-dimensional code is provided. The system includes: a terminal, receiving an operation instruction and encoding the operation instruction as a digital vector; obtaining a first audio three-dimensional code corresponding to a preset speech signal, and encoding the digital vector into the first audio three-dimensional code to obtain a second audio three-dimensional code; and converting the second audio three-dimensional code into a speech signal and sending the speech signal to a sound receiving device; and the sound receiving device, receiving the speech signal sent by the terminal; converting the speech signal to obtain a third audio three-dimensional code, registering the third audio three-dimensional code with a pre-stored first audio three-dimensional code, and extracting a digital vector from the third audio three-dimensional code if registration succeeds; and obtaining an operation instruction through parsing based on the digital vector and a pre-stored mapping relationship between the digital vector and the operation instruction.

For a specific definition of the system for parsing a control signal of a sound receiving device based on a dual-mode audio three-dimensional code, refer to the foregoing definition of the method for parsing a control signal of a sound receiving device based on a dual-mode audio three-dimensional code. Details are not described herein again. All or some of the modules in the system for parsing a control signal of a sound receiving device based on a dual-mode audio three-dimensional code may be implemented by using software, hardware, or a combination of software or hardware. The foregoing modules may be built in or independent of a processor of a computer device in a hardware form, or may be stored in a memory of the computer device in a software form, so that the processor invokes and performs operations corresponding to the modules.

In an embodiment, a computer device is provided. The computer device may be a terminal. The computer device includes a processor, a memory, a network interface, a display screen, and an input apparatus that are connected by using a system bus. The processor of the computer device is configured to provide computing and control capabilities. The memory of the computer device includes a nonvolatile storage medium and an internal memory. The nonvolatile storage medium stores an operating system and a computer program. The internal memory provides an environment for running the operating system and the computer program in the nonvolatile storage medium. The network interface of the computer device is configured to be connected to and communicate with an external terminal through a network. A method for parsing a control signal of a sound receiving device based on a dual-mode audio three-dimensional code is implemented when the computer program is executed by the processor. The display screen of the computer device may be a liquid crystal display or an electronic ink display. The input apparatus of the computer device may be a touch layer covering the display screen, may be a key, a trackball, or a touch pad disposed on a housing of the computer device, or may be an external keyboard, touch pad, or mouse.

A person skilled in the art can understand that the structure in the foregoing embodiment is merely a partial structure related to the solutions of this application, and does not constitute a limitation on the computer device to which the solutions of this application are applied. Specifically, the computer device may include more or fewer components, combine some components, or have different component arrangements.

In an embodiment, a computer device is provided, including a memory and a processor. The memory stores a computer program, and the processor implements the steps of the methods in the foregoing embodiments when executing the computer program.

In an embodiment, a computer-readable storage medium is provided. The computer-readable storage medium stores a computer program, and the steps of the methods in the foregoing embodiments are implemented when the computer program is executed by a processor.

A person of ordinary skill in the art can understand that all or some of processes for implementing the methods in the foregoing embodiments may be implemented by instructing related hardware by using a computer program. The computer program may be stored in a nonvolatile computer-readable storage medium. The processes in the embodiments of the foregoing methods may be performed when the computer program is executed. Any reference to a memory, a storage, a database, or other media used in the embodiments provided in this application may include a nonvolatile memory and/or a volatile memory. The nonvolatile memory may include a read-only memory (ROM), a programmable ROM (PROM), an electrically programmable ROM (EPROM), an electrically erasable programmable ROM (EEPROM), or a flash memory. The volatile memory may include a random access memory (RAM) or an external cache memory. By way of description but not limitation, the RAM is available in various forms, such as a static RAM (SRAM), a dynamic RAM (DRAM), a synchronous DRAM (SDRAM), a double data rate SDRAM (DDR SDRAM), an enhanced SDRAM (ESDRAM), a synchlink (Synchlink) DRAM (SLDRAM), a Rambus (Rambus) direct RAM (RDRAM), a direct Rambus dynamic RAM (DRDRAM), and a Rambus dynamic RAM (RDRAM).

The technical features of the foregoing embodiments may be randomly combined. For brevity of description, not all possible combinations of the technical features of the foregoing embodiments are described. However, the combinations of these technical features should be considered as falling within the scope of this specification provided that there is no contradiction between the combinations.

According to the foregoing method and apparatus for controlling a sound receiving device based on a dual-mode audio three-dimensional code, first, for a sound receiving device that can recognize a speech signal, instead of using a knob or a button for control, an operation instruction is digitally encoded to obtain a digital vector, and then a first audio three-dimensional code corresponding to a speech signal is selected. The digital vector is encoded into the first audio three-dimensional code to obtain a second audio three-dimensional code. Because control of the digital vector does not cause a change of output of the speech signal, the operation instruction is sent to the sound receiving device along with the speech signal. Second, because the sound receiving device can parse the speech signal, the control method of the present invention requires no modification to the sound receiving device and also causes no additional power consumption, and is particularly applicable to a device, such as a digital hearing aid, with a high volume requirement and endurance requirement.

The foregoing embodiments merely describe several implementations of this application, and description of the implementations is relatively specific and detailed, but shall not be understood as a limitation on the patent scope of the present invention. It should be noted that a person of ordinary skill in the art may further make several variations and improvements without departing from the idea of this application, and the variations and improvements shall fall within the protection scope of this application. Therefore, the protection scope of this application patent shall be subject to the appended claims.

What is claimed is:

1. A method for controlling a sound receiving device based on a dual-mode audio three-dimensional code, wherein the method comprises:

receiving an operation instruction and encoding the operation instruction as a digital vector;

obtaining a first audio three-dimensional code corresponding to a preset speech signal, and encoding the digital vector into the first audio three-dimensional code to obtain a second audio three-dimensional code, wherein the encoding the digital vector into the first audio three-dimensional code to obtain the second audio three-dimensional code comprises:

selecting control indicators corresponding to element values from the first audio three-dimensional code;

calculating sound spectrogram grayscale values corresponding to different elements in the digital vector based on the control indicators and a preset control parameter; and encoding the digital vector into the first audio three-dimensional code based on a sound spectrogram grayscale value corresponding to each element in the digital vector, to obtain the second audio three-dimensional code; and converting the second audio three-dimensional code into a speech signal and sending the speech signal to a sound receiving device.

2. The method according to claim 1, wherein the selecting control indicators corresponding to element values from the first audio three-dimensional code comprises:

obtaining distribution information of the element values in the first audio three-dimensional code; and determining at least two control indicators based on the distribution information.

3. The method according to claim 2, wherein the determining at least two control indicators based on the distribution information comprises:

calculating a maximum value and a minimum value of the element values based on the distribution information, and performing sampling at a preset step based on the maximum value and the minimum value to obtain a plurality of control values; and obtaining the control indicators based on the maximum value, the minimum value, and the control values.

4. The method according to claim 2, wherein the determining at least two control indicators based on the distribution information comprises:

calculating a maximum value, a minimum value, and a mean value of the element values based on the distribution information; and using the maximum value, the minimum value, and the mean value as the control indicators.

5. The method according to claim 3, wherein the calculating sound spectrogram grayscale values corresponding to different elements in the digital vector based on the control indicators and a preset control parameter comprises:

using the preset control parameter as an adjustment weight, performing logical calculation between the control indicators, and weighting a logical calculation result by using the adjustment weight, to obtain the sound spectrogram grayscale values corresponding to the different elements in the digital vector.

6. The method according to claim 4, wherein the calculating sound spectrogram grayscale values corresponding to different elements in the digital vector based on the control indicators and a preset control parameter comprises:

calculating a difference between the maximum value and the minimum value, and multiplying the difference by the control parameter to obtain deviation information; and performing addition/subtraction calculation based on the mean value and the deviation information to obtain the sound spectrogram grayscale values corresponding to the different elements in the digital vector, wherein the grayscale values corresponding to the different elements in the digital vector are determined by controlling a size of the deviation information and a sign of the addition/subtraction calculation.

7. The method according to claim 1, wherein the encoding the digital vector into the first audio three-dimensional code based on a sound spectrogram grayscale value corresponding to each element in the digital vector, to obtain the second audio three-dimensional code comprises:

performing splicing on the digital vector based on the sound spectrogram grayscale value corresponding to each element in the digital vector to obtain an audio three-dimensional code segment; and inserting the audio three-dimensional code segment into the first audio three-dimensional code to obtain the second audio three-dimensional code.

8. The method according to claim 7, wherein the inserting the audio three-dimensional code segment into the first audio three-dimensional code to obtain the second audio three-dimensional code comprises:

obtaining a preset position parameter, and inserting the audio three-dimensional code segment into a position corresponding to the position parameter in the first audio three-dimensional code based on the position parameter, to obtain the second audio three-dimensional code.

9. The method according to claim 1, wherein the converting the second audio three-dimensional code into a speech signal and sending the speech signal to a sound receiving device comprises:

performing inverse Fourier transform on the second audio three-dimensional code to obtain the speech signal; and sending the speech signal to the sound receiving device as an instruction control signal.

10. The method according to claim 1, wherein the sound receiving device is a hearing aid or a digital hearing aid.

11. A method for parsing a control signal of a sound receiving device based on a dual-mode audio three-dimensional code, the signal is generated by the method according to claim 1, wherein the method comprises:

receiving the speech signal according to claim 1 that is sent by a terminal, wherein the speech signal is converted from a second audio three-dimensional code, the second audio three-dimensional code is obtained by encoding the digital vector into the first audio three-dimensional code, wherein the encoding the digital vector into the first audio three-dimensional code to obtain a second audio three-dimensional code comprises:

selecting control indicators corresponding to element values from the first audio three-dimensional code;

calculating sound spectrogram grayscale values corresponding to different elements in the digital vector based on the control indicators and a preset control parameter; and encoding the digital vector into the first audio three-dimensional code based on a sound spectrogram grayscale value corresponding to each element in the digital vector, to obtain the second audio three-dimensional code;

converting the speech signal to obtain a third audio three-dimensional code, registering the third audio three-dimensional code with a pre-stored first audio three-dimensional code, and extracting a digital vector from the third audio three-dimensional code if registration succeeds; and obtaining an operation instruction through parsing based on the digital vector and a pre-stored mapping relationship between the digital vector and the operation instruction.

12. The method according to claim 11, wherein the registering the third audio three-dimensional code with a pre-stored first audio three-dimensional code comprises:

traversing element values in the first audio three-dimensional code and the third audio three-dimensional code, wherein registration succeeds when a sum of differences between the element values in the first audio three-dimensional code and the third audio three-dimensional code is less than a threshold.

13. The method according to claim 12, wherein the extracting a digital vector from the third audio three-dimensional code if registration succeeds comprises:

obtaining a deviation existing between the first audio three-dimensional code and the third audio three-dimensional code when the sum of the differences between the element values in the first audio three-dimensional code and the third audio three-dimensional code is less than the threshold; and extracting the digital vector from the third audio three-dimensional code based on the deviation.

14. The method according to claim 13, wherein the method further comprises:

selecting a corresponding area in the third audio three-dimensional code based on a position parameter and registering the corresponding area with the first audio three-dimensional code.

15. The method according to claim 14, wherein the registering the third audio three-dimensional code with a pre-stored first audio three-dimensional code comprises:

registering the third audio three-dimensional code F3 with the pre-stored first audio three-dimensional code F1 according to a registration algorithm, wherein the registration algorithm is as follows:

$$f(a,b,c)=\Sigma|F1(x,y,z)-F3(x+a,y+b,z+c)|,$$

wherein x represents time, y represents frequency, z represents amplitude, a represents a deviation value of x, b represents a deviation value of y, and c represents a deviation value of z, element values in the third audio three-dimensional code F3 are traversed to find a deviation (a0,b0,c0) that minimizes f(a,b,c), and registration succeeds when f f(a0,b0,c0)<th, wherein th is a threshold.

16. The method according to claim 15, wherein the extracting a digital vector from the third audio three-dimensional code if registration succeeds comprises:

if registration succeeds, extracting a data block from the third audio three-dimensional code by using an extraction algorithm, and parsing the data block to obtain the digital vector, wherein the extraction algorithm is as follows:

$$D2=F3(s1+a0:s1+a0+w0-1,s1+b0:s1+b0+Nw0-1,s1+c0:s1+c0+w0-1),$$

wherein

D2 indicates the data block, s1 indicates the position parameter, a length, a width, and a height of each component in the digital vector are all w0, and N indicates a quantity of components.

17. The method according to claim 16, wherein the parsing the data block to obtain the digital vector comprises:

parsing the data block by using a decoding algorithm, to obtain the digital vector, wherein the decoding algorithm is as follows:

$$vect2(i)=g\left(\frac{1}{w0\times w0\times w0\times m3}\sum D2(:,(i-1)w0+1:iw0,:)\right)$$

wherein m3 indicates a mean value of elements in the first audio three-dimensional code, vect2(i) indicates the digital vector, $$g(x)=\begin{cases}0 & x\le 1\\ 1 & x>1\end{cases},$$

and i∈[1,N].

18. The method according to claim 11, wherein the terminal is a mobile phone, a tablet computer, or a wearable device.

19. A system for parsing a control signal of a sound receiving device based on a dual-mode audio three-dimensional code, wherein the system comprises:

a terminal, receiving an operation instruction and encoding the operation instruction as a digital vector; obtaining a first audio three-dimensional code corresponding to a preset speech signal, and encoding the digital vector into the first audio three-dimensional code to obtain a second audio three-dimensional code, wherein the encoding the digital vector into the first audio three-dimensional code to obtain a second audio three-dimensional code comprises: selecting control indicators corresponding to element values from the first audio three-dimensional code; calculating sound spectrogram grayscale values corresponding to different elements in the digital vector based on the control indicators and a preset control parameter; and encoding the digital vector into the first audio three-dimensional code based on a sound spectrogram grayscale value corresponding to each element in the digital vector, to obtain the second audio three-dimensional code; and converting the second audio three-dimensional code into a speech signal and sending the speech signal to a sound receiving device; and the sound receiving device, receiving the speech signal sent by the terminal; converting the speech signal to obtain a third audio three-dimensional code, registering the third audio three-dimensional code with a pre-stored first audio three-dimensional code, and extracting a digital vector from the third audio three-dimensional code if registration succeeds; and obtaining an operation instruction through parsing based on the digital vector and a pre-stored mapping relationship between the digital vector and the operation instruction.

* * * * *